No. 642,456. Patented Jan. 30, 1900.
L. C. IBSEN.
LIQUID COOLER.
(Application filed June 29, 1899.)
(No Model.) 2 Sheets—Sheet 1.

Witnesses
Harry L. Amer,
Rexford M. Smith

Inventor
Lars C. Ibsen,
By V. D. Stockbridge.
Attorney

THE NORRIS PETERS CO., PHOTO-LITHO., WASHINGTON, D. C.

No. 642,456. Patented Jan. 30, 1900.
L. C. IBSEN.
LIQUID COOLER.
(Application filed June 29, 1899.)
(No Model.) 2 Sheets—Sheet 2.
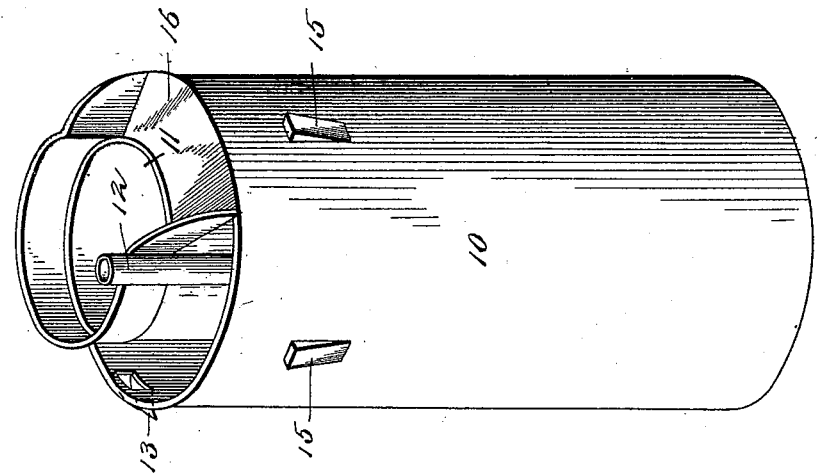
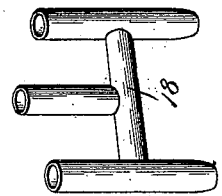
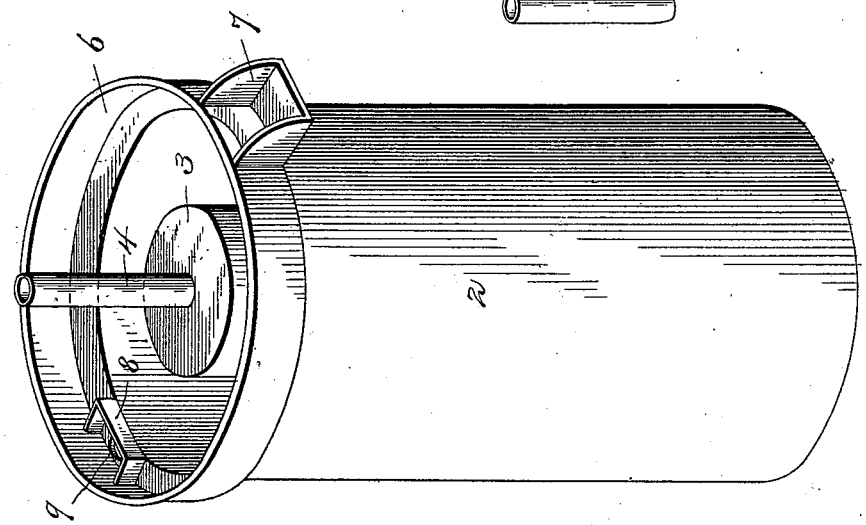
Witnesses
Harry L. Amer
Rexford M. Smith
Inventor
Lars C. Ibsen.
By V. D. Stockbridge.
Attorney

UNITED STATES PATENT OFFICE.

LARS C. IBSEN, OF IRENE, SOUTH DAKOTA.

LIQUID-COOLER.

SPECIFICATION forming part of Letters Patent No. 642,456, dated January 30, 1900.

Application filed June 29, 1899. Serial No. 722,313. (No model.)

*To all whom it may concern:*

Be it known that I, LARS C. IBSEN, a citizen of the United States, residing at Irene, in the county of Turner and State of South Dakota, have invented a certain new and useful Milk or other Liquid Cooler, of which the following is a specification, reference being had therein to the accompanying drawings.

This invention relates to milk or other liquid coolers.

The object of the invention is to provide a cooler through which there may be a constant circulation of cool water from a spring or well past and on opposite sides of a plurality of annular milk-containing chambers.

The invention consists in certain constructions and combinations hereinafter described and claimed.

Figure 3:
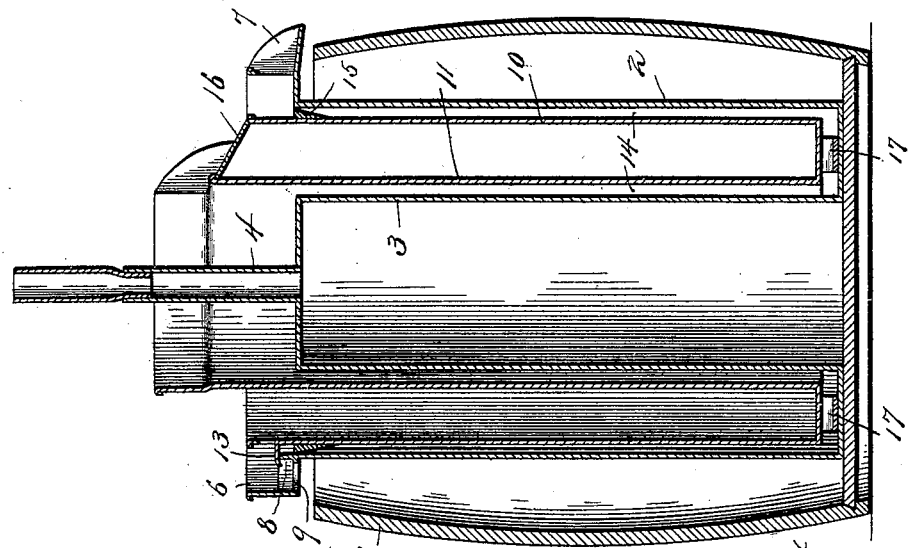
Figure 2:
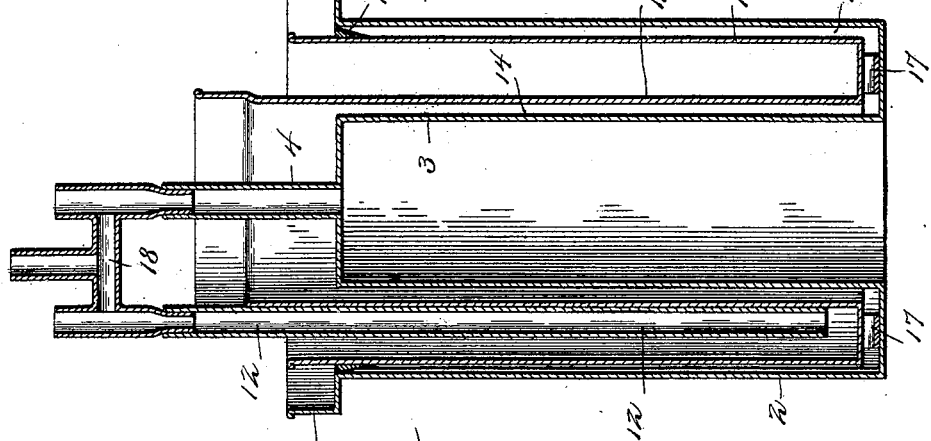
Figure 1:
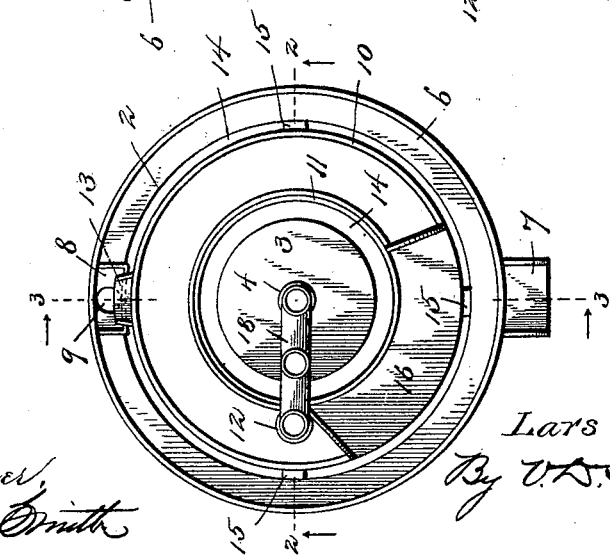

In the drawings, Figure 1 is a plan of my improved cooler. Fig. 2 is a section of the same on the line 2 2 of Fig. 1. Fig. 3 is a section of the same on the line 3 3 of Fig. 1 and shown as being immersed in a barrel or like inclosing vessel. Fig. 4 is a perspective of the outer shell or part of my cooler. Fig. 5 is also a perspective of an inner part adapted to be inserted within the outer shell, and Fig. 6 is a perspective of water-supply tube.

1 is a barrel or receptacle of suitable character within which my improved cooler is to be arranged when in use.

2 is a metallic vessel having a copper or non-corrodible outer surface and a tinned inner surface. This vessel is provided with an internal hollow cylinder or drum 3, having a pipe 4 leading into the top or upper end thereof from a source of water-supply. The vessel is also provided at its upper end with an annular enlargement 6, from which leads a cream or milk spout 7. There is also provided within the enlargement a pocket or gland 8, through the bottom of which is a passage 9 for the overflow of water from an interior vessel to the barrel or inclosing vessel.

10 is an interior vessel carrying an interior concentric open-ended cylinder 11. Attached to the side of the concentric cylinder 11 is a water-supply pipe or conduit 12, leading from the main water-supply. The vessel 10 is provided with an overflow-spout 13 for the overflow of water into the pocket 8 in the outer vessel 2. The vessel 10 is of a diameter such as to pass freely into the main vessel 2 and leave an annular milk-space 14 between its exterior and the interior of said outer vessel, and in order to center the vessel 10 within the vessel 2 I provide a series of inclined lugs 15. Leading from one side of the upper end of the cylinder 11 is an overflow-spout 16 for the overflow of foam to the annular enlargement 6, so that it may escape through milk or cream spout 7. The interior vessel is also provided at the bottom with a series of supports or feet 17 17 to hold the same away from the bottom of the outer vessel, so as to provide a continuous milk space or chamber 14 between the walls 3 and 11 and the walls 2 and 10.

For conveniently and simultaneously supplying water and conducting it to pipe or passage 4 and conduit 12 I have provided a branched supply-pipe 18. (Shown with particularity in Figs. 2 and 6.) The outside of the interior vessel and the inside of the concentric open-ended cylinder are provided with tinned surfaces, and the opposite sides of said parts are provided with copper or non-corrodible surfaces, so that the surfaces in contact with water will be non-corrodible and the surfaces with which the milk is in contact will not be corroded or affected by the milk in contact therewith.

In operation cool water from a spring or well is conducted through branched supply-pipe 18 and through pipes 4 and 12 to the apparatus. The water passing through pipe 4 fills the cylinder or drum 3, passes beneath the same into the barrel, and thereby surrounds the vessel 2. Water through pipe 12 fills the space between vessel 10 and open-ended cylinder 11 and overflows through spout 13 into pocket or gland 8 and thence into the barrel. The overflow from the barrel may be conducted away in any suitable manner. Circulation of water having been established through the cooler, milk or cream is introduced to the mouth of 11, passes by gravity into the annular compartment 14, and thence out through spout 7.

Having described my invention, what I claim, and desire to secure by Letters Patent, is—

1. A milk-cooler involving the combination of an outer metallic vessel having an internal hollow cylinder or drum, an annular enlargement at the upper end, a milk-overflow spout 7 leading from said enlargement, a pocket also formed in said enlargement, having a passage leading from its bottom, and an inner vessel having an interior concentric open-ended cylinder, a water-overflow spout leading from the vessel, and a foam-overflow spout leading from the concentric hollow cylinder, and means for introducing water, substantially as described.

2. A milk-cooler involving the combination of an outer metallic vessel having an internal hollow cylinder or drum, with water-supply pipe communicating with the drum and having an annular enlargement with a milk-overflow spout leading therefrom, and a pocket in the enlargement with a passage leading from the bottom thereof, and an inner vessel having an interior concentric cylinder with water-supply pipe leading to the bottom between the vessel and its concentric hollow cylinder, a water-overflow spout, and a foam-overflow spout, substantially as described.

3. The combination of a barrel or inclosing vessel, and a metallic vessel having an internal hollow cylinder or drum with water-supply pipe communicating with the drum and having an annular enlargement with a milk-overflow spout leading therefrom, and a pocket in the enlargement with a passage leading from the bottom thereof, and an inner vessel having an interior concentric cylinder with water-supply pipe leading to the chamber between the vessel and its concentric hollow cylinder, a water-overflow spout, and a foam-overflow spout, substantially as described.

In testimony whereof I affix my signature in presence of two witnesses.

LARS C. IBSEN.

Witnesses:
D. E. A. LUNDQUIST,
WILL IBSEN.